United States Patent [19]

Teramachi

[11] Patent Number: 5,011,300

[45] Date of Patent: Apr. 30, 1991

[54] LINEAR SLIDING BEARING

[75] Inventor: Hiroshi Teramachi, Tokyo, Japan

[73] Assignee: THK Co., Ltd., Tokyo, Japan

[21] Appl. No.: 469,465

[22] PCT Filed: Aug. 15, 1989

[86] PCT No.: PCT/JP89/00829

§ 371 Date: Apr. 3, 1990

§ 102(e) Date: Apr. 3, 1990

[87] PCT Pub. No.: WO90/02271

PCT Pub. Date: Mar. 8, 1990

[30] Foreign Application Priority Data

Aug. 16, 1988 [JP] Japan .................. 63-202668

[51] Int. Cl.$^5$ .................. F16C 21/00; F16C 29/06
[52] U.S. Cl. .................. 384/25; 384/45
[58] Field of Search .................. 384/25, 43–45, 384/49, 50

[56] References Cited

U.S. PATENT DOCUMENTS

| | | | |
|---|---|---|---|
| 4,417,771 | 11/1983 | Teramachi | 384/45 |
| 4,527,842 | 7/1985 | Teramachi | 384/45 |
| 4,773,770 | 9/1988 | Osawa et al. | 384/45 |
| 4,940,339 | 7/1990 | Amano | 384/25 |
| 4,953,988 | 9/1990 | Tsukada | 384/45 |

FOREIGN PATENT DOCUMENTS

| | | |
|---|---|---|
| 2546995 | 12/1984 | France . |
| 60-185273 | 12/1985 | Japan . |
| 61-34934 | 8/1986 | Japan . |
| 61-223325 | 10/1986 | Japan . |
| 61-48009 | 10/1986 | Japan . |

*Primary Examiner*—Thomas R. Hannon
*Attorney, Agent, or Firm*—Armstrong, Nikaido, Marmelstein, Kubovcik, & Murray

[57] ABSTRACT

A linear sliding bearing which is composed of a ball-and-roller bearing mechanism and a sliding bearing mechanism. The gap between a track base and a sliding bed is adjusted by gap adjusting bolt, to adjust the pressure of contact between the two faces constituting the sliding bearing mechanism thereby to adjust the sliding resistance of the sliding bed to the track base at will. As a result, a rigidity can be given even in the axial direction of the track base so that the machining precision of a workpiece can be improved when a machine apparatus such as a machine tool is to be used.

2 Claims, 6 Drawing Sheets

LINEAR SLIDING BEARING

TECHNICAL FIELD

The present invention relates to a linear sliding bearing for linearly guiding a moving member to be slid in a machine tool such as a NC machine or a slide of an industrial robot.

BACKGROUND ART

In case a workpiece is to be machined by a machine tool, for example, loads accompanying the machining in various directions are generally exerted between the machine tool and the workpiece, although depending upon the kinds of machining such as cutting or polishing, the material of the workpiece o the machining conditions. The loads act as reaction forces upon the machine tool and the workpiece. If the machine tool and the workpiece are completely fixed at the instant of machining, the machining can be ideally accomplished in a drastically improved precision.

In the case of machining of the workpiece using such machine tool, one of the machine tool or the workpiece is fixed whereas the other is moved by means of a mechanism such as a linear sliding bearing.

The linear sliding bearing to be used for this purpose is exemplified by one which comprises: a sliding bed having a section of generally inverted C-shape and including a horizontal portion and a pair of skirts depending downward from the two ends of the horizontal portion to form a recess at its lower side and formed in its inner sides with a pair of upper and lower load races extending longitudinally thereof and with relief ball tracks corresponding to the load races; a track base having its upper portion fitted in the recess of said sliding bed, while maintaining a predetermined spacing inbetween, and formed with rolling races corresponding to said load races; a pair of covers attached to the front and rear end faces of said sliding bed and formed in their inner sides with guide grooves for providing the communicating connections between the end portions of the load races and the relief ball tracks of said sliding bed to form endless ball tracks; a multiplicity of balls circulating in said endless ball tracks to bear the loads between the load races of said sliding bed and the rolling grooves of said track base; and gap adjusting means for adjusting the gap between said sliding bed and said track base to apply and adjust a pilot pressure (as disclosed in Japanese Patent Publications Nos. 61-34,934 and 61-48,009). Thus, the linear sliding bearing can bear the loads in the four directions, i.e., radial, inversely radial and rightward and leftward directions. In the linear sliding bearing of this kind, moreover, the rigidities in the four directions are enhanced by applying or adjusting the pilot pressure to the rollers to bear the four-directional loads to be generated between the machine tool and the workpiece during the machining, so that the accompanying chatter marks and vibrations may be suppressed as much as possible to improve the machining precision. In connection with the axial direction of the track base, on the other hand, what is principally aimed at is to lighten the loads upon the feeding drive system such as a feeder of screw and nut type or a linear motor mechanism. The rigidity necessary for the machining in the axial direction of the track base relies exclusively upon that of the feeding drive system.

Incidentally, the rigidity of the feeding drive system is determined, if the system is the feeder of screw and nut type, by the rigidity of the feed screw or nut itself, the rigidity of the support of the feed screw or nut, and the rigidity of the servo-motor for applying a rotating force to the feed screw. In order to increase the rigidity of the feeding drive system, it is necessary to enlarge the size of the feed screw or nut or to raise the driving force of the servo-motor. Thus, the increase in the rigidity of the feeding drive system is intrinsically limited by the problems which are caused by increasing the size of the apparatus or by raising the cost for the feeding drive system.

As various products are required to be the more precise accurate in the industry of recent years, a machine apparatus such as the machine tool for machining the products is required to have its machining precision improved the better. Thus, the linear sliding bearing taking a leading role for the machining precision of the various machine apparatus is requested to improve the machining precision.

It is, therefore, an object of the present invention to provide a linear sliding bearing which can have not only the rigidities of four directions, i.e., the radial, inversely radial, rightward and leftward directions but also a predetermined rigidity in the axial direction of the track base.

Another object of the present invention is to provide a linear sliding bearing which can apply the rigidity in the axial direction of the track base, if necessary, and adjust the level of the rigidity.

Still another object of the present invention is to provide a linear sliding bearing which is equipped with a lock mechanism capable of fixing the sliding bed in a target position when the sliding bed is moved along the track base to that position.

A further object of the present invention is to provide a linear sliding bearing which is enabled to accomplish the machining of high precision by adopting a machine apparatus such as a machine tool.

DISCLOSURE OF THE INVENTION

According to the present invention, there is provided a linear sliding bearing comprising: a sliding bed having a section of generally inverted C-shape and including a horizontal portion and a pair of skirts depending downward from the two ends of the horizontal portion to form a recess at its lower side and formed in its inner sides with a pair of load races extending longitudinally thereof and with relief ball tracks corresponding to the load races; a track base having its upper portion fitted in the recess of said sliding bed, while maintaining a predetermined spacing inbetween, and formed with rolling races corresponding to said load races; a pair of covers attached to the front and rear end faces of said sliding bed and formed in their inner sides with guide grooves for providing the communicating connections between the end portions of the load races and the relief ball tracks of said sliding bed to form endless ball tracks; and a multiplicity of rolling members circulating in said endless ball tracks to bear the loads between the load races of said sliding bed and the rolling grooves of said track base, wherein the improvement resides: in that the load races of said sliding bed are formed in the inner sides and at the roots of said skirts; in that the races of said track base corresponding to the load races of said sliding bed are formed at the shoulders of said track base; in that there is formed, between each of the leading ends of the inner sides of the skirts of said sliding bed and each of the two sides of the track base facing the former, a sliding bearing mechanism which include convex and concave portions having upward taper surfaces and downward taper surfaces shaped to be fitted in a wedged manner; and in that there is interposed, between said sliding bed and a table to be mounted on the upper surface of said sliding bed, gap adjusting means which includes a suspension or pressure mechanism for elastically deforming the horizontal portion of said sliding bed, whereby the pressure of contact between the upward and downward taper surfaces of said sliding bed and the downward and upward taper surfaces of said track base is adjusted by adjusting the gap between said sliding bed and said track base by said gap adjusting means.

Thus, in the linear sliding bearing according to the present invention, a ball-and-roller bearing mechanism having a low sliding resistance is constituted by the load races of the sliding bed, the races of the track base, and the rolling members rolling between these races, and a sliding bearing mechanism is constituted by the convex and concave portions having upward and downward taper surfaces positioned in the lower portions of the sliding bed and the track base and facing each other. By adjusting the gap between the sliding bed and the track base by the gap adjusting means, the pressure of contact between the upward and downward taper surfaces of the sliding bed and the downward and upward taper surfaces of the track base can be adjusted to give and adjust a rigidity to the ball-and-roller bearing mechanism and to adjust the sliding resistance of the sliding bearing mechanism thereby to give and adjust the rigidity in the axial direction of the track base. In necessary, moreover, the sliding bearing mechanism can be acted as a lock mechanism.

In the present invention, the rolling members for rolling between the sliding bed and the track base while bearing the loads may be exemplified by balls or rollers, but the former balls are preferable from the standpoint of smoothening the gap adjustment.

In the sliding bearing mechanism to be formed between the leading ends of the inner sides of the skirts of the sliding bed and the two sides of the track base, moreover, the convex portions or the concave portions may be formed in either of the sliding bed and the track base. From the standpoint of better smoothening the gap adjustment, it is preferable that the leading ends of the inner sides of the skirts of the sliding bed are formed with the convex portions of a generally trapezoidal section having the upward and downward taper surfaces whereas the two sides of the track base are formed with the convex portions of the shape having the downward and upward taper surfaces and corresponding to the convex portions.

Still moreover, the gap adjusting means for adjusting the gap between the sliding bed and the track base may be the suspension or pressure mechanism which can apply a suspension or pressure and accordingly an elastic deformation to the central portion of the sliding bed to adjust the gap between the sliding bed and the track base. The suspension or pressure mechanism may be specifically exemplified by forming a pair of mounting faces on the upper surface of the horizontal portion of the sliding bed over and longitudinally of the two skirts of the sliding bed, by mounting a table on the paired mounting faces by a plurality of fastening bolts to leave a predetermined gap between the upper surface of the horizontal portion and the lower side of the table and between the mounting faces, by equipping the table with gap adjusting bolts for applying suspending or pressing forces to the horizontal portion through the table at an intermediate position of the paired mounting faces, and by turning the gap adjusting bolts to elastically deform the horizontal portion of the sliding bed thereby to adjust the gap between the sliding bed and the track base according to the elastic deformation. The gap adjusting bolts may be a suspending bolt to be fastened in a gap adjusting screw hole formed in an intermediate position of the horizontal portion of the sliding bed, pressing bolts extending downward to abut against the intermediate position of the horizontal portion of the sliding bed, or a combination of plural suspending and pressing bolts of which the suspending bolt is arranged between a pair of the pressing bolts along the intermediate position of the horizontal portion of the sliding bed.

DESIGNATIONS OF THE REFERENCE CHARACTERS

Figure 1:
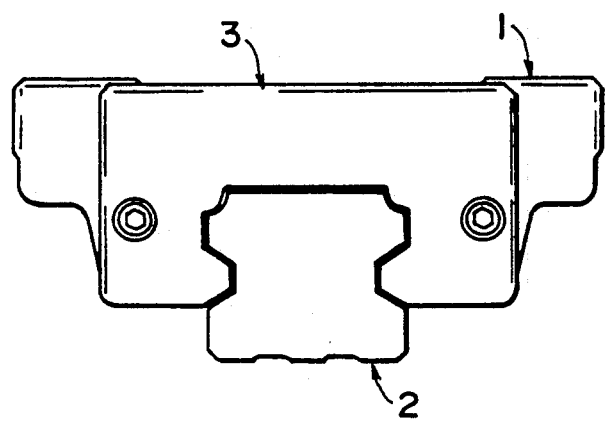
FIG. 1 is a front elevation showing a first embodiment of a linear sliding bearing according to the present invention.
Figure 2:
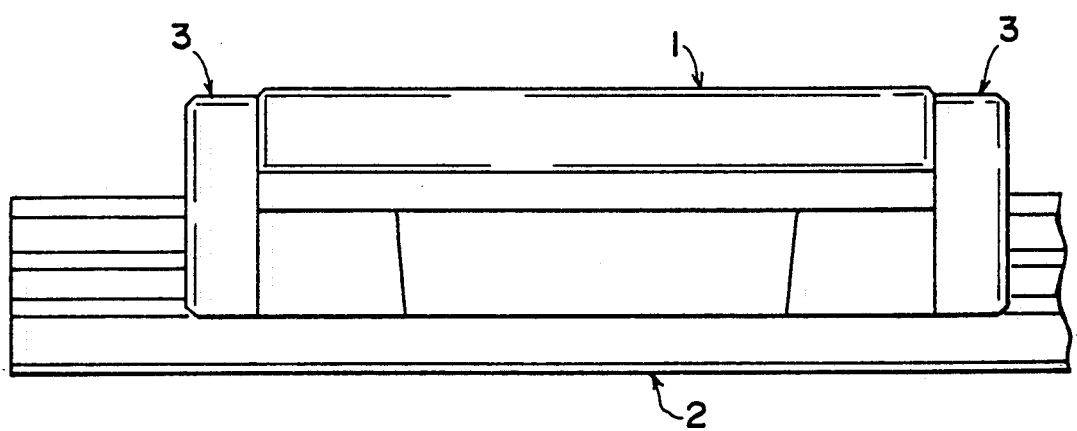
FIGS. 2 and 3 are a side elevation and a top plan view of the linear sliding bearing of the first embodiment.
Figure 3:
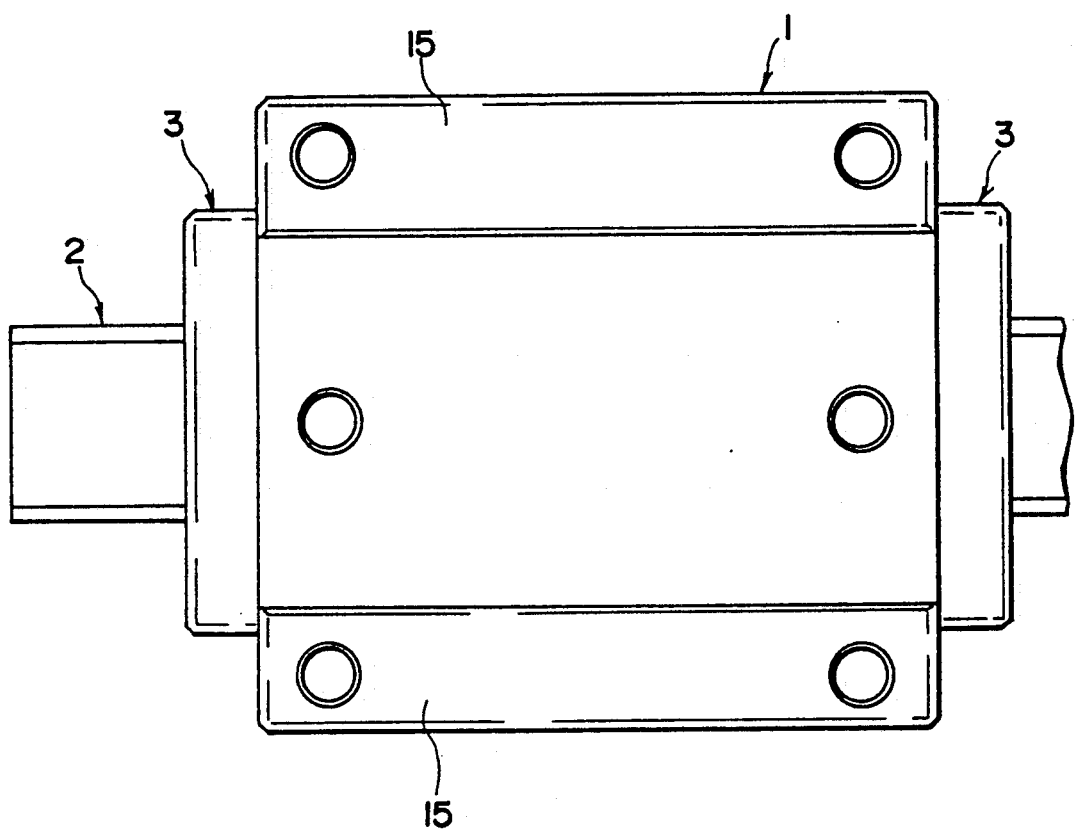
Figure 4:
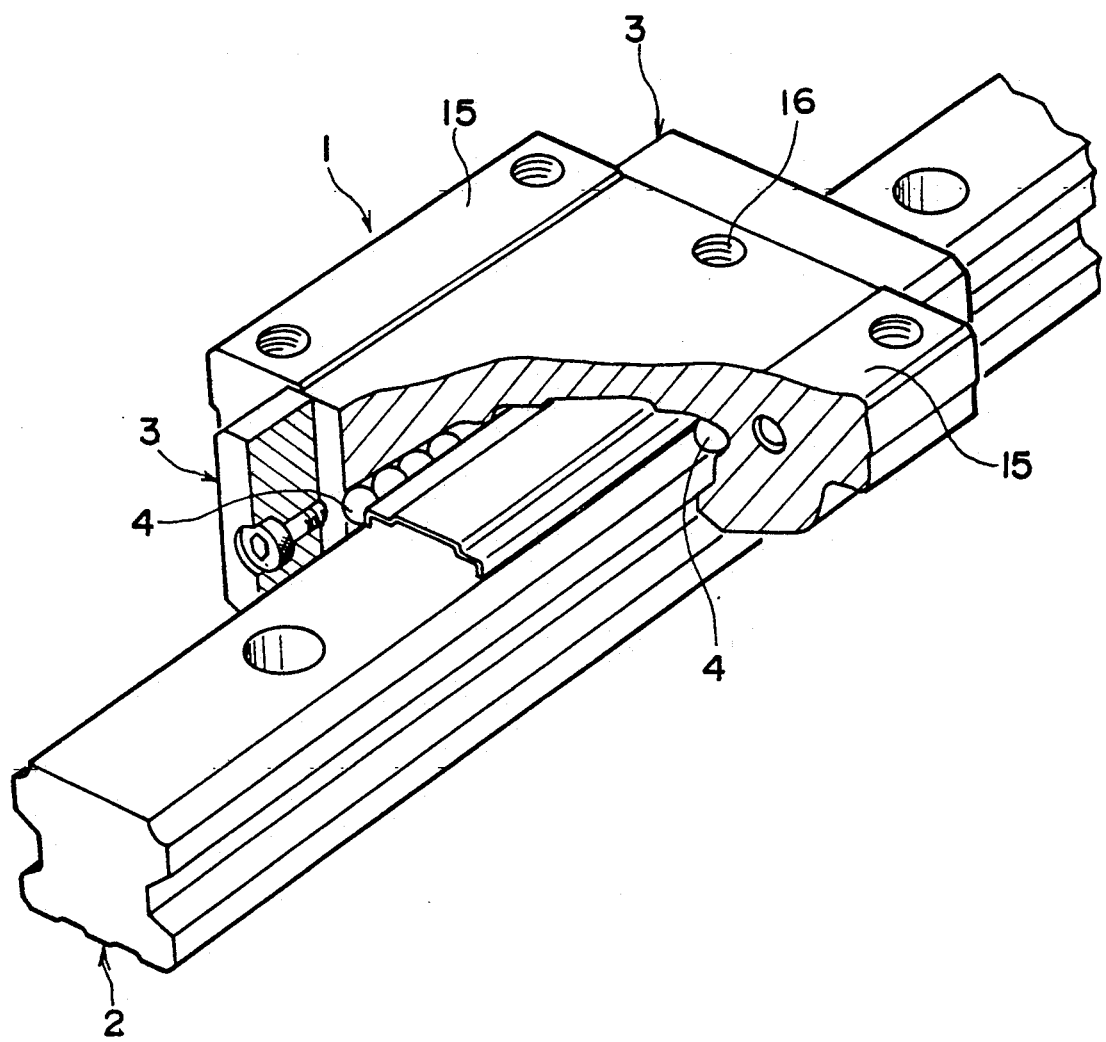
FIG. 4 is a cut-away perspective view showing the linear sliding bearing according to the first embodiment.

1 - Sliding Bed;
2 - Track Base;
3 - Covers;
4 - Balls;
5 - Fastening Bolts
6 - Suspending Bolts;
11 - Load Races;
12 - No-Load Ball Holes;
13 - Upward Taper Surfaces (at Sliding Bed Side);
14 - Downward Taper Surfaces (at Sliding Bed Side);
15 - Mounting Faces;
16 - Gap Adjusting Screw Hole;
21 - Races;
22 - Downward Taper Surfaces (at Track Base Side);
23 - Upward Taper Surfaces (at Track Base Side);
T - Table;
and B - Bearing.

BEST MODE FOR CARRYING OUT THE INVENTION

The linear sliding bearing according to the present invention will be specifically described in the following in connection with th embodiment thereof with reference to the accompanying drawings.

A linear sliding bearing B according to the present invention is shown in FIGS. 1 to 4. This bearing B is constructed to comprise: a sliding bed 1 of a generally inverted C-shaped section including a horizontal portion 1a and a pair of skirts 1b depending downward from the two sides of the horizontal portion 1a to leave a recess at the lower side; a track base 2 having its upper portion fitted in the recess of the sliding bed 1 at a predetermined gap inbetween; a pair of covers 3 attached to the front and rear end faces of the sliding bed 1; and a number of balls 4 rolling between the sliding bed 1 and the track base 2 while bearing the loads.

The sliding bed 1 is formed with an arcuately-curved load race 11, which is extended longitudinally along the root of the inner side of each of the skirts 1b, and a no-load ball hole 12 constituting a no-load track corresponding to the load race 11. On the other hand, the track base 2 is formed at its two shoulders with races 21 which correspond to the load races 11 of the sliding bed 1. Moreover, each of the covers 3 is formed in its inner side with a guide groove for providing the communicating connections between the load races 11 of the sliding bed 1 and the end portions of the no-load ball holes 12 to form an endless track. The aforementioned numerous balls 4 are circulated to roll in each of the endless tracks thereby to bear the loads between the load races 11 of the sliding bed 1 and the races 21 of the track base 2.

On the other hand, the inner side of each of the skirts 1b of the sliding bed 1 is formed at its leading end with the convex portion having a generally trapezoidal section composed of an upward taper surface 13 and a downward taper surface 14. Moreover, the track base 2 is formed at each of its two sides with a convex portion which is composed of such an downward taper surface 22 and an upward taper surface 23 as are matched by the aforementioned convex portion. These convex and concave portions are fitted in such a wedged manner to constitute a sliding bearing mechanism that their upward and downward taper surfaces face each other.

Figure 5:
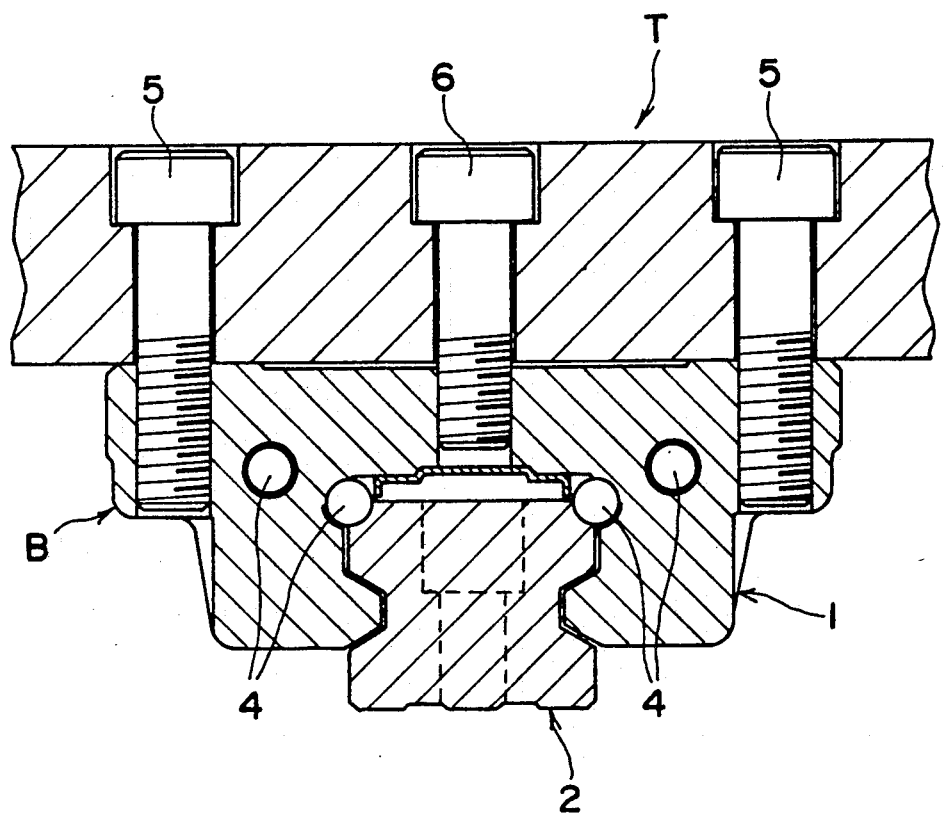
FIG. 5 is a section showing the state in which the linear sliding bearing according to the first embodiment is used.
Figure 6:
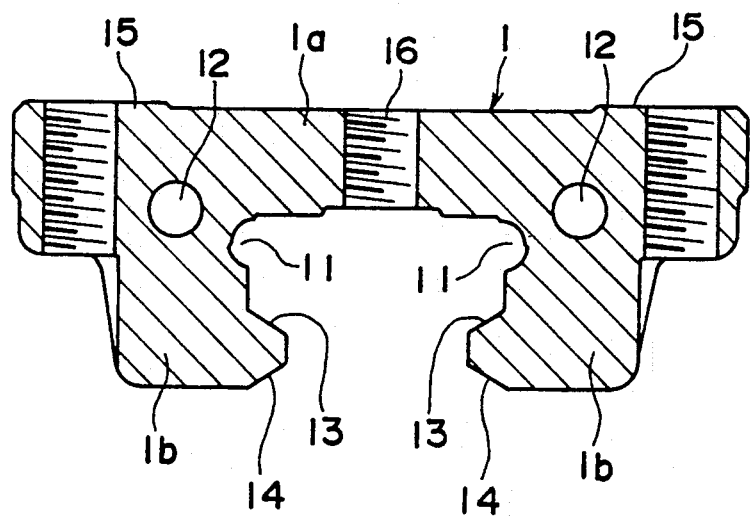
FIG. 6 is a section showing the sliding bed of the linear sliding bearing according to the first embodiment.
Figure 7:
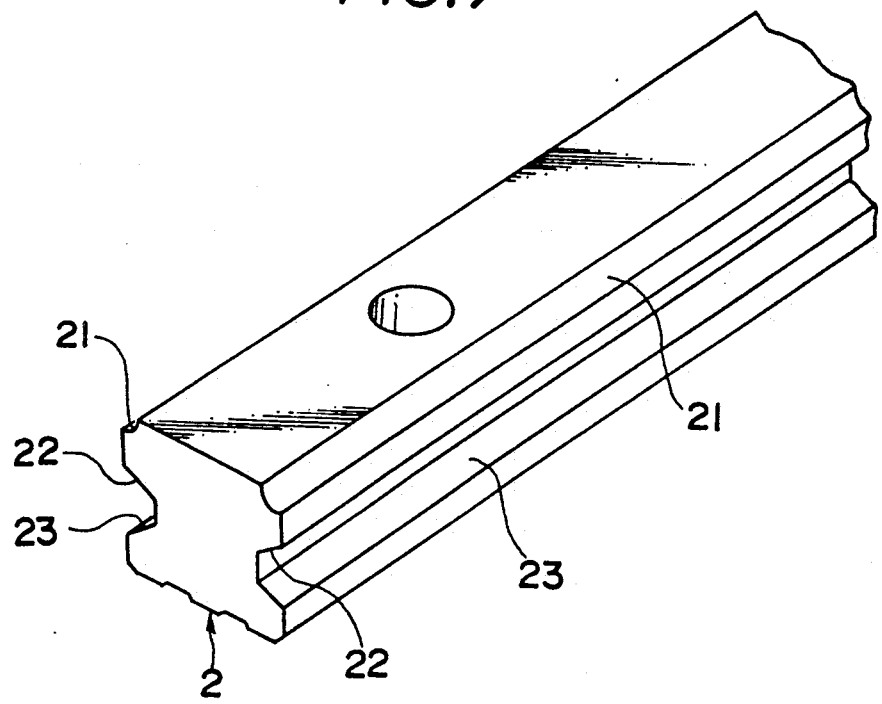
FIG. 7 is a perspective view showing the track base of the linear sliding bearing according to the first embodiment.

As shown in FIG. 5, moreover, there is interposed, between the sliding bed 1 and the table T to be mounted on the upper surface of the sliding bed 1, gap adjusting means for elastically deforming the horizontal portion 1a of the sliding bed 1. Since the gap between the sliding bed 1 and the track base 2 is adjusted by that means, the pressure of contact between the upward and downward tape surfaces 13 and 14 of the sliding bed 1 and the downward and upward taper surfaces 22 and 23 of the track base 2 can be accordingly adjusted.

In this embodiment, the gap adjusting means is constructed by forming a pair of mounting faces 15 on the upper surface of the horizontal portion 1a of the sliding bed 1 in the longitudinal direction over the two skirts 1b, by mounting the table T to the mounting faces 15 by means of the plural fastening bolts 5 while leaving the predetermined gap between the upper surface of the horizontal portion 1a and the lower side of the table T, by equipping the table T with a gap adjusting bolt or the suspending bolt 6 which is extended through the table T and fitted in a gap adjusting screw hole 16 formed in an intermediate position between the paired mounting faces 15, and by turning the suspending bolt 6 to apply the suspending force to the horizontal portion 1a of the sliding bed 1 thereby to deform the horizontal portion 1a elastically so that the gap between the sliding bed 1 and the track base 2 may be adjusted according to the elastic deformation.

Figure 8:
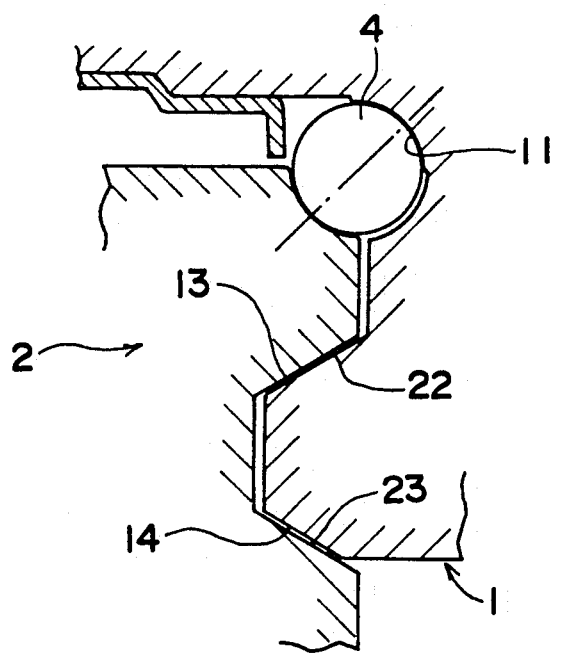
FIG. 8 is a section showing an essential portion in the state in which the concave portion at the sliding bed of the sliding bearing mechanism of the linear sliding bearing according to the first embodiment has no pressure of contact with the concave portion of the track base.
Figure 9:
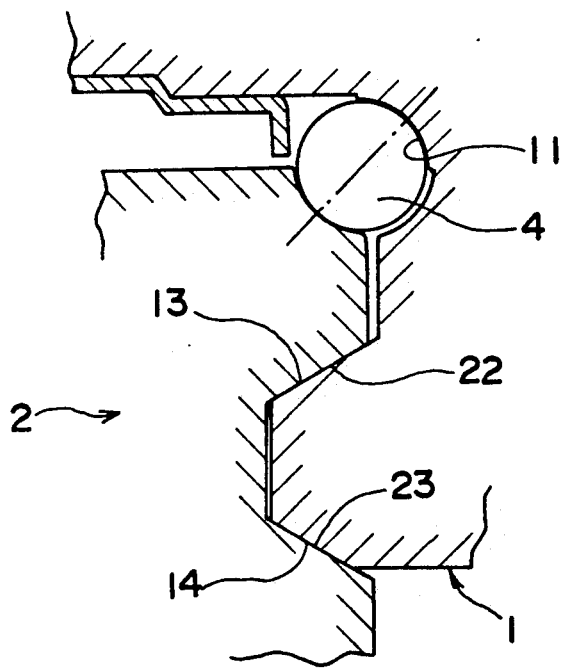
FIG. 9 is a section showing an essential portion in the state in which the concave portion at the sliding bed of the sliding bearing mechanism of the linear sliding bearing according to the first embodiment has pressure of contact with the concave portion of the track base.

Thus, according to the linear sliding bearing B of the present embodiment, the pressure of contact between the upward and downward taper surfaces 13 and 14 of the sliding bed 1 and the downward and upward taper surfaces 22 and 23 of the track base 2 can be adjusted by turning the suspending bolt 6 which is fastened in the gap adjusting screw hole 16 of the sliding bed 1, while the sliding bed 1 is being assembled with the table T, as shown in FIG. 5. If, at this time, the suspending bolt 6 is loosened, the pressure of contact between the taper surfaces of the track base 2 and the taper surfaces of the sliding bed 1 is dropped until it disappears, so that the sliding bed 1 can slide on the track base 2 with a slight sliding resistance (as shown in FIG. 8). If, on the contrary, the suspending bolt 6 is fastened, the pressure of contact between the taper surfaces of the track base 2 and the sliding bed 1 is raised to increase the frictional forces between the upward and downward taper surfaces 13 and 14 of the sliding bed 1 and the downward and upward taper surfaces 22 and 23 of the track base 2 so that a high sliding resistance is exerted when the sliding bed 1 slides on the track base 2 (as shown in FIG. 9).

Thus, in the linear sliding bearing B according to the present embodiment, the sliding resistance of the sliding bed 1 can be increased by fastening the gap adjusting bolt 6, to apply the rigidity of the axial direction of the track base 2 to the linear sliding bearing B.

In the linear sliding bearing B of the present embodiment, moreover, the degree of fastening the gap adjusting bolt 6 can be suitably adjusted to apply the rigidity of the axial direction of the track base 2, if necessary, and to adjust the level of the rigidity at will.

INDUSTRIAL APPLICABILITY

As has been described hereinbefore, according to the linear sliding bearing of the present invention, the sliding resistance when the sliding bed slides on the track base can be adjusted to apply or adjust the rigidity of the axial direction of the track base, if necessary.

Since, moreover, the sliding bearing mechanism is constructed of the convex and concave portions fitted in the wedged manner, the loads to be exerted in the radial or inversely radial direction upon the sliding bed can be auxiliarily borne. Especially when the impacting load of the radial direction is exerted upon the sliding bed, the rolling members can be prevented from being broken while protecting the load races of the sliding bed and the races of the track base.

If necessary, a high pressure of contact can be applied between the taper surfaces of the sliding bed and the taper surfaces of the track base by the gap adjusting means to exert an excessive sliding resistance to the sliding bed so that the sliding bed can be continuously fixed in a portion on the track base, whereby the sliding bearing mechanism can be acted as a lock mechanism.

I claim:

1. A linear sliding bearing comprising: a sliding bed having a section of generally inverted C-shape and including a horizontal portion and a pair of skirts depending downward from the two ends of the horizontal portion to form a recess at its lower side and formed in its inner sides with a pair of load races extending longitudinally thereof and with relief ball tracks corresponding to the load races; a track base having its upper portion fitted in the recess of said sliding bed, while maintaining a predetermined spacing inbetween, and formed with rolling races corresponding to said load races; a pair of covers attached to the front and rear end faces of said sliding bed and formed in their inner sides with guide grooves for providing the communicating connections between the end portions of the load races and the relief ball tracks of said sliding bed to form endless ball tracks; and a multiplicity of rolling members circulating in said endless ball tracks to bear the loads between the load races of said sliding bed and the rolling grooves of said track base, wherein the improvement resides: in that the load races of said sliding bed are formed in the inner sides and at the roots of said skirts; in that the races of said track base corresponding to the load races of said sliding bed are formed at the shoulders of said track base; in that there is formed, between each of the leading ends of the inner sides of the skirts of said sliding bed and each of the two sides of the track base facing the former, a sliding bearing mechanism which include convex and concave portions having upward taper surfaces and downward taper surfaces shaped to be fitted in a wedged manner; and in that there is interposed, between said sliding bed and a table to be mounted on the upper surface of said sliding bed, gap adjusting means which includes a suspension or pressure mechanism for elastically deforming the horizontal portion of said sliding bed, whereby the pressure of contact between the upward and downward taper surfaces of said sliding bed and the downward and upward taper surfaces of said track base is adjusted by adjusting the gap between said sliding bed and said track base by said gap adjusting means.

2. A linear sliding bearing as set forth in claim 1, wherein said sliding bed includes a convex portion of a generally trapezoidal section having an upward taper surface and a downward taper surface at the leading end of the inner side of each of the skirts thereof, and wherein said track base includes a concave portion shaped to correspond to said convex portion and to have a downward taper surface and an upward taper surface at each of the two sides thereof.

* * * * *